# (12) United States Patent
Riegl et al.

(10) Patent No.: US 6,852,975 B2
(45) Date of Patent: Feb. 8, 2005

(54) METHOD FOR THE RECORDING OF AN OBJECT SPACE

(75) Inventors: Johannes Riegl, Trabenreith (AT); Andreas Ullrich, Gablitz (AT); Wolfgang Zierlinger, Rohrendorf (AT)

(73) Assignee: Riegl Laser Measurement Systems GmbH, Horn (AT)

( * ) Notice: Subject to any disclaimer, the term of this patent is extended or adjusted under 35 U.S.C. 154(b) by 0 days.

(21) Appl. No.: 10/263,659

(22) Filed: Oct. 4, 2002

(65) Prior Publication Data

US 2003/0047684 A1 Mar. 13, 2003

Related U.S. Application Data

(63) Continuation of application No. PCT/IB01/00424, filed on Mar. 21, 2001.

(30) Foreign Application Priority Data

Apr. 7, 2000 (AT) .................................... A 593/2000

(51) Int. Cl.[7] .............................................. G02B 26/10
(52) U.S. Cl. ...................... 250/334; 250/330; 356/5.01
(58) Field of Search ................................ 250/330, 334; 356/3, 4.01, 5.01, 5.04, 602, 627; 348/135; 382/152

(56) References Cited

U.S. PATENT DOCUMENTS

| | | | | |
|---|---|---|---|---|
| 4,841,489 A | * | 6/1989 | Ozaki et al. ................... 367/7 |
| 5,125,745 A | * | 6/1992 | Neiheisel et al. ............ 356/602 |
| 5,212,738 A | * | 5/1993 | Chande et al. ............... 382/152 |
| 5,485,009 A | * | 1/1996 | Meyzonnetie et al. ...... 356/5.09 |
| 5,528,354 A | * | 6/1996 | Uwira ......................... 356/5.01 |
| 5,644,386 A | * | 7/1997 | Jenkins et al. ............. 356/4.01 |
| 5,682,229 A | * | 10/1997 | Wangler ..................... 356/4.01 |
| 5,752,167 A | * | 5/1998 | Kitayoshi ................. 455/67.11 |
| 5,995,206 A | * | 11/1999 | Morinaka et al. .......... 356/4.01 |
| 6,362,872 B1 | * | 3/2002 | Berdanier ................... 356/4.01 |
| 6,399,948 B1 | * | 6/2002 | Thomas et al. ........... 250/341.6 |

FOREIGN PATENT DOCUMENTS

WO    WO 9913355 A1 *  3/1999  ........... G01S/17/02

* cited by examiner

*Primary Examiner*—David Porta
*Assistant Examiner*—Davienne Monbleau
(74) *Attorney, Agent, or Firm*—Burns, Doane, Swecker & Mathis, L.L.P.

(57) ABSTRACT

The invention relates to a method for the recording of an object space with an opto-electronic distance sensor by a signal propagation time method, with a transmitter for transmitting optical signals, in particular those of a laser, and a receiver device for receiving optical signals, in particular laser radiation, which is reflected from objects located in the target space. The distance sensor is combined with a scanning device for deflecting the optical axes of the transmitter and receiver device, and it has an evaluation device, which from the propagation time or phase angle of the optical signal emitted ascertains distance values. Downstream of the scanning device, that is, out of the region oriented toward the distance sensor, part of the beam is split off from the beam path of the transmitter and/or receiver device and is directed to receiver diodes or the like, and from the corresponding signals, a pixel is ascertained and each pixel is assigned a distance value and a space angle.

13 Claims, 5 Drawing Sheets

METHOD FOR THE RECORDING OF AN OBJECT SPACE

RELATED APPLICATIONS

This application claims priority under 35 U.S.C. §§119 and 365 to Austrian Application A593/2000 filed in Austria on Apr. 7, 2000 and is a continuation under 35 U.S.C. §120 of PCT/IB01/00424, filed as an International Application on Mar. 21, 2001 and designating the United States, the entire contents of which are hereby incorporated by reference.

BACKGROUND OF THE INVENTION

1. Field of the Invention

The invention relates to a method for the recording of an object space with an opto-electronic distance sensor by a signal propagation time method, with a transmitter for transmitting optical signals, in particular those of a laser, and a receiver device for receiving optical signals, in particular laser radiation, which is reflected from objects located in the target space. The distance sensor is combined with a scanning device for deflecting the optical axes of the transmitter and receiver device, and it has an evaluation device, which from the propagation time or phase angle of the optical signal emitted ascertains distance values. Downstream of the scanning device, that is, out of the region oriented toward the distance sensor, part of the beam is split off from the beam path of the transmitter and/or receiver device and is directed to receiver diodes or the like, and from the corresponding signals, a pixel is ascertained and each pixel is assigned a distance value and a space angle.

2. Background Information

Distance sensor scanners furnish so-called distance images, that is, images whose pixels, encoded in gray-scale value stages or false colors, indicate distance values. This technology has gained access to many areas of technology, such as architecture, building construction, etc. One advantage of these systems compared to conventional distance measuring devices is that in the shortest possible time, such a large number of points in the object space can be surveyed and documented that from these data, three-dimensional structures can be reconstructed. On the one hand, on the basis of a distance image of this kind, arbitrary other views of the three-dimensional structure can be generated, and on the other, these data can be further processed using CAD (Computer Aided Design) programs.

Such systems have found a particular application in the steel industry: Converters, ladles or the like in which steel melts are treated are exposed to relatively high wear. These converters or the like have a steel jacket which has an inner lining of kiln bricks. As a rule, this brick lining comprises at least two layers: an inner wear layer facing the melt, and a safety lining directly on the steel jacket. One essential task of this masonry lining is to protect the steel jacket against an excessive thermal load. Even a local defect in the masonry lining can lead to catastrophic damage to the system and must therefore be prevented with certainty. Besides, repairing or renewing the masonry lining is an extraordinarily complicated process and means a long down time.

To attain maximum operating safety on the one hand and on the other to assure the most economical possible operation of the system, the converters or the like are inspected. To that end, immediately after the evacuation of the converter, the container interior is surveyed with a distance sensor. Because of the brief measuring time and the tight network of measurement points, laser distance sensor scanners have proved themselves especially suitable for this task. Typically, after the masonry lining of the converter has been produced, the interior is surveyed, and several reference points are picked up on the converter itself that make it possible to represent the interior with reference to a fixed coordinate system. Upon an inspection during system operation, the interior is surveyed once again. The coordinate systems of both surveys are made to coincide, and the distance images are subtracted from one another. The resultant distance image then shows the deviations from the outset state of the masonry lining. Broken-away-bricks or extreme wear of the lining thus becomes visible.

SUMMARY OF THE INVENTION

As has been explained above, because of the long down time and the attendant loss of production, the decision to overhaul a converter is a very significant one in terms of operating economy. To improve the certainty of this decision, it is now proposed that the measurement be further secured by using a second, independent measurement method. To that end, according to the invention, the receiver device is equipped with sensors, preferably diodes, that are sensitive to one or more defined spectral ranges, preferably infrared, and from the signals of these sensors, a temperature value is calculated, and parallel to the distance image, a coincident thermal image is generated.

Advantageously, in use for surveying hot objects, that is, objects with a temperature of approximately 600° C., preferably at least 1000° C., sensors for the primary colors of visible light (RGB diodes) are used.

In an advantageous refinement of the invention, as an alternative or in addition to the sensors for generating a pixel, such special infrared sensors, such as InGaAs and Si diodes, can be used that are sensitized in various IR spectral ranges.

In measuring methods of the type defined above, in which the sensitivity of the receiver device of the distance sensor, in high-temperature applications, is reduced in accordance with the background brightness to avoid overdrive from background noise, in accordance with a further feature of the invention for each pixel one temperature value is ascertained, and from it, an individual correction value for each distance value pertaining to the applicable pixel is calculated, so that the measurement error resulting from the reduction in sensitivity can be compensated for individually for each pixel.

BRIEF DESCRIPTION OF THE DRAWINGS

Further characteristics of the invention will become apparent from the ensuing description of preferred exemplary embodiments, shown schematically in the drawing, in which.

DETAILED DESCRIPTION OF THE DRAWINGS

Figure 1:
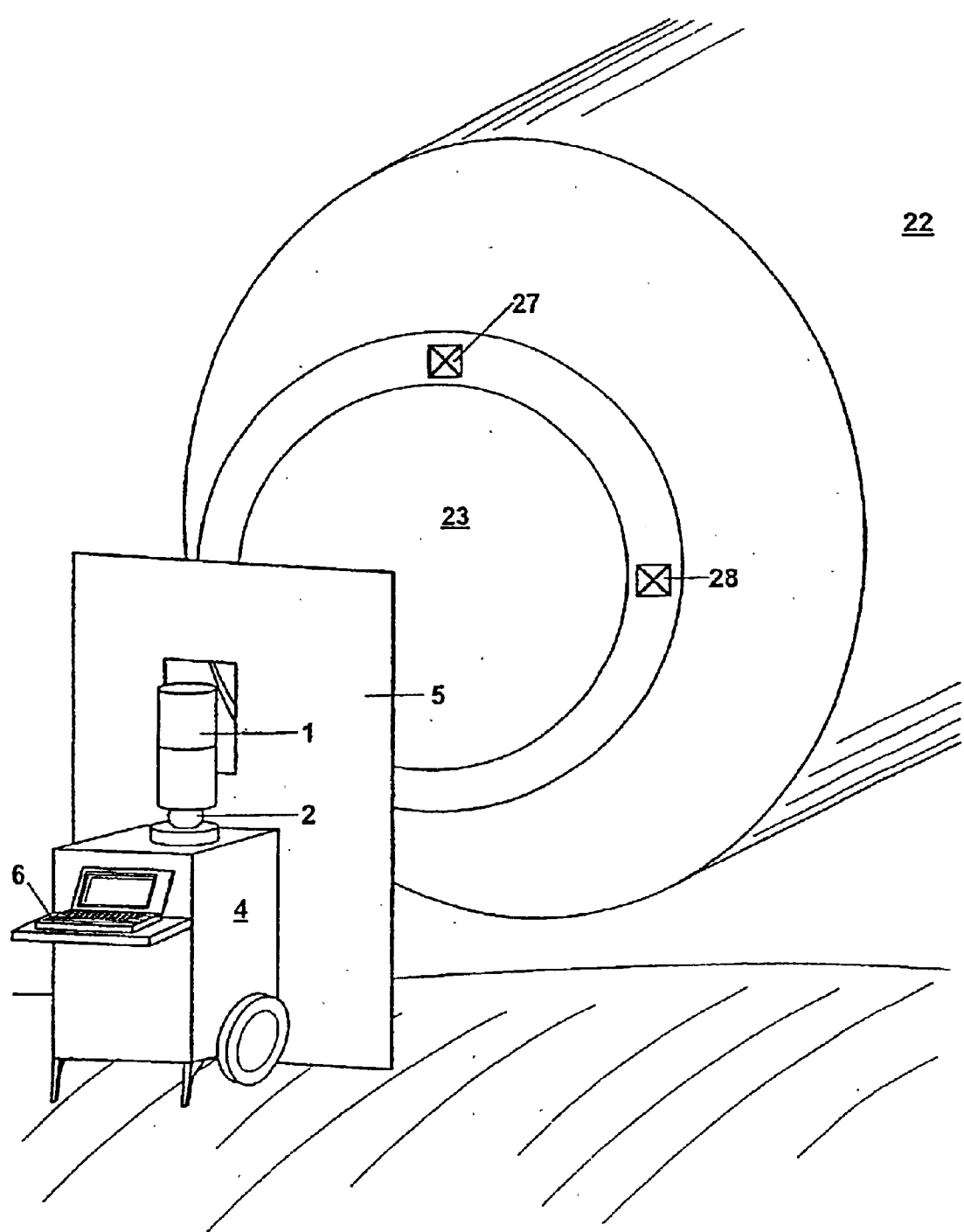
FIG. 1 shows a laser distance scanner in a measurement position in front of the opening of a steel converter.
Figure 2:
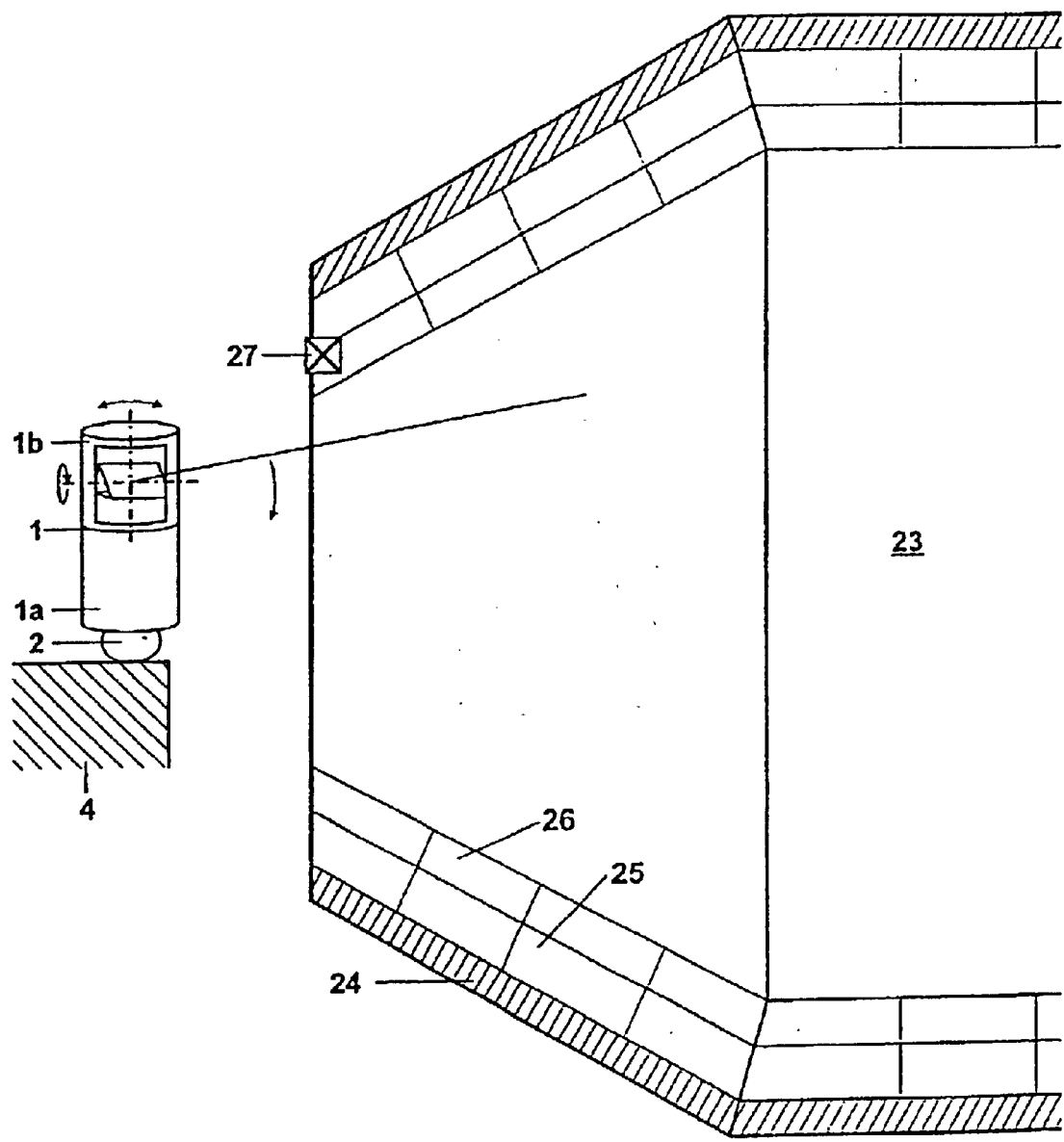
FIG. 2 shows this device with the converter in axial section.

In FIGS. 1 and 2, a scanner is shown, which has a laser distance sensor and an image recording unit combined with it. The equipment is mounted on a cart 4, to which a measurement head 1 is secured. With a ball head 2, the measurement head 1 can be coarsely aligned with the converter 22. The system and the person operating it are protected by a guard shield 5, in particular against the extreme radiation from the converter interior. Reference numeral 6 indicates a converter by way of which the system is controlled and which is used for evaluating and storing the results. On the computer screen, the results can be monitored practically in real time.

In FIG. 2, the system is shown in additional details. The measurement head 1 comprises a lower part 1a, which is rigidly joined to the ball head 2. An upper part 1b of the measurement head is pivotably supported about a vertical axis on the lower part 1a of the measurement head. This upper part includes a mirror prism, rotating about a horizontal axis, that is driven at high speed by a motor. By means of this prism, both the measurement beam and the pickup beam of the image recording are deflected, and as a result the interior of the converter 23 is scanned in the form of vertically extending lines. For scanning the converter horizontally, the upper part 1b of the measurement head is moved by motor back and forth relative to the lower part 1a. FIG. 2 furthermore shows the steel jacket 24 of the converter and the masonry safety lining 25, which is adjoined toward the inside by the masonry wear lining 26. The two masonry linings comprise fireproof material and protect the steel jacket of the converter. At least three reference marks 27 and 28, which define a coordinate system for the converter inner wall, are either secured to the converter jacket or let into the masonry lining in the region of the maw of the converter. Introducing such a converter coordinate system simplifies the alignment of the measurement system substantially: It suffices to place the measurement cart in front of the converter in accordance with markings on the floor and optionally to align the measurement head vertically. Since in the scanning the reference marks can be recorded as well, when the images are evaluated they can be aligned manually or automatically relative to an image taken previously and then made to coincide.

With the aid of the new method, it is possible simultaneously with a distance image to take a coincident thermal image. The distance images are compared in general with distance images that were taken either after the masonry lining was done or upon the last inspection of the converter. By subtracting the two images, a differential image is created. To make interpreting such images easier, they are output either in false color encoding or with contour lines.

Figure 4:
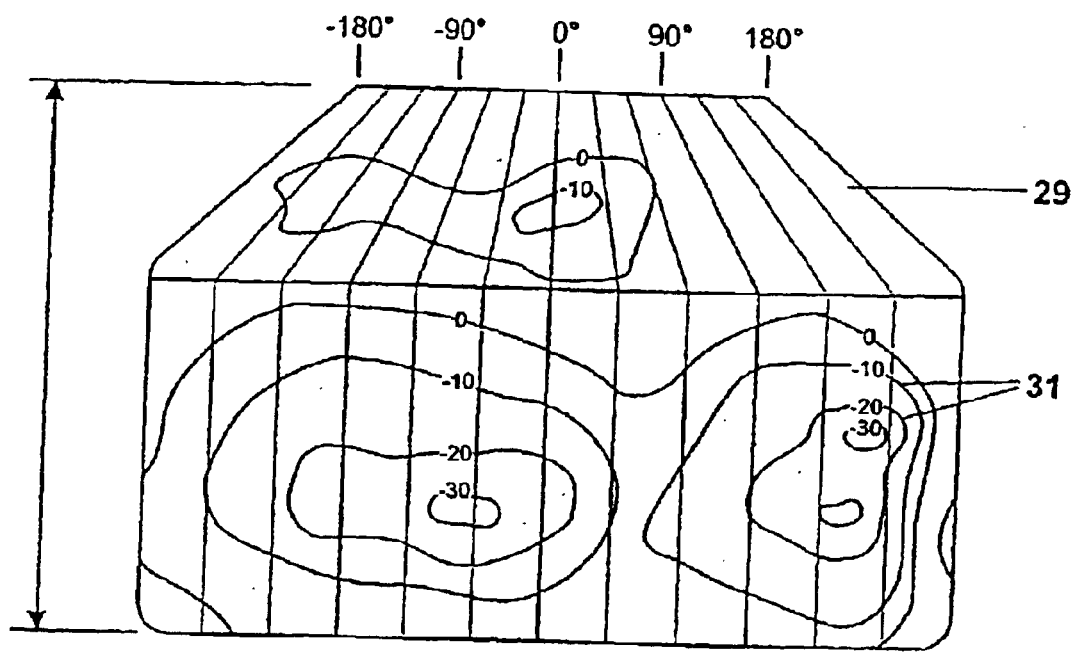
FIGS. 4 and 5 show the inner wall of the converter (in FIG. 4 in the form of a developed view) along with the measurement results.
Figure 5:
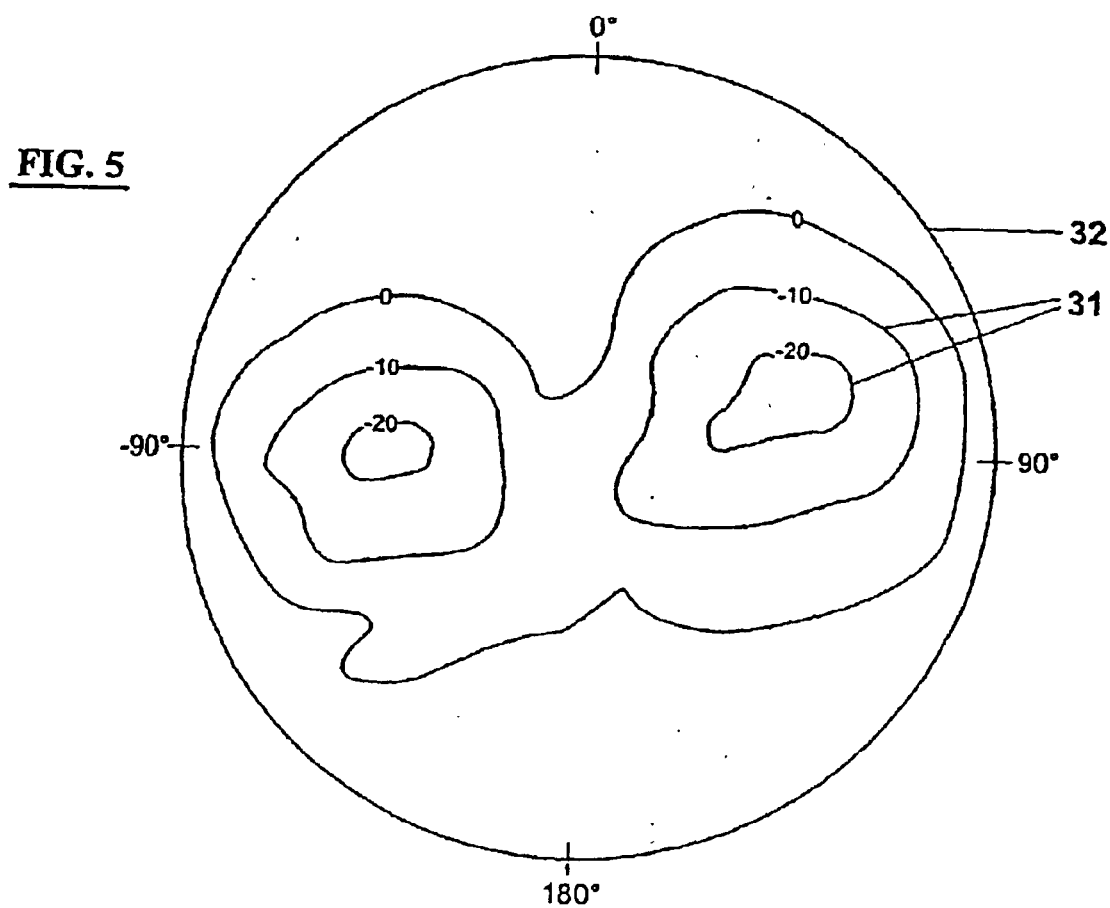

FIGS. 4 and 5 show such screen images or expressions for a developed view of the inner jacket 29, the converter 22, and the floor 32. Reference numeral 31 indicates contour lines. The distance images are displayed analogously. Since they are completely coincident with the distance images, they can not only be output alternatively but can also be superimposed on one another. Places in the masonry lining that have high wear or have broken-away kiln bricks are expressed both in the distance image and as a corresponding change compared with an earlier state, but are also clearly visible in the thermal image. Because of the reduction in the thermal insulation, in such regions there is an increased flow of heat from the inner wall of the converter to the steel jacket 24, so that places with high wear or breakage appear markedly colder in the thermal image. Since the two outputs have been created by completely different measuring methods, a match in the results is an important confirmation of these results.

Figure 3:
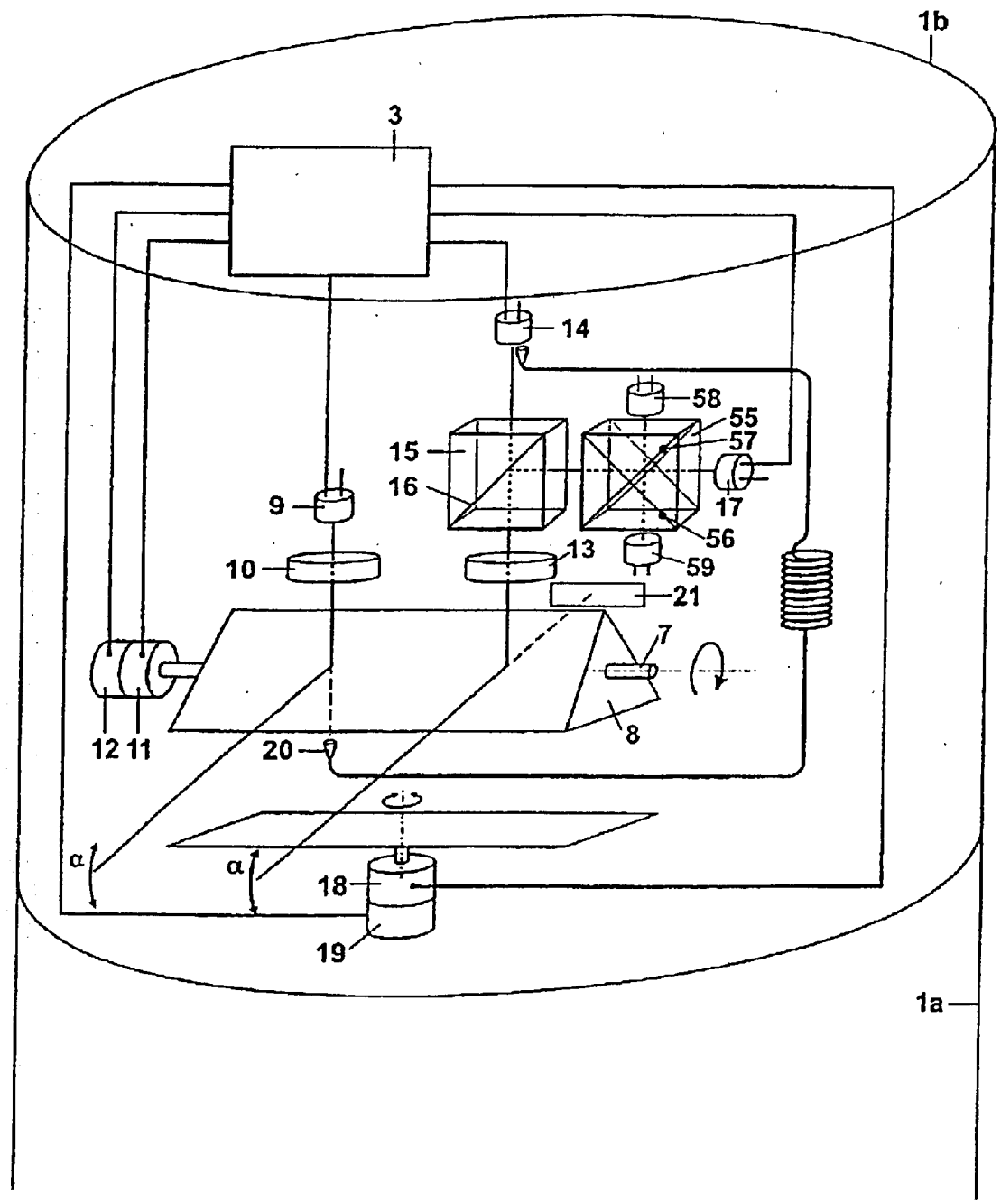
FIG. 3 shows the measurement head of the scanner schematically.

FIG. 3 shows the scanning unit of the measurement head 1 in additional details. The control unit 3 feeds a laser diode 9, whose beam is projected by an optical element 10 into infinity. The essentially parallel-aligned beams are deflected by the three-sided, mirror-coated prism 8, which rotates about an axis 7 and is driven by a motor 11. By means of an angle decoder 12 connected to the motor 11, a position signal is fed back to the control unit 3. Because of the rotation of the prism 8, the laser beam in the object space sweeps over an angle of approximately 80°. The laser beam is reflected from targets located in the object space and is focused by an optical element 13 onto a receiver diode 14. The corresponding received beam is deflected by the same mirror prism 8, so that the transmitted and received beams are aligned essentially parallel. Between the optical element 13 and the diode 14, there is a beam splitting prism 15, whose partly mirror-coated splitting face 16 is coated dichroically, so that infrared laser light can pass through this face practically unattenuated, while visible light and infrared radiation of a different wavelength is reflected onto a second beam splitter prism 55. This prism has two partly reflective faces 56 and 57, which are likewise coated dichroically. This prism splits the incident light for instance into the three primary colors RGB, or into infrared of different wavelengths. The corresponding sensors are indicated at 17, 58 and 59. With such an arrangement, besides the distance image, a coincident color (or false-color thermal) video image can be created.

As already noted at the outset, the object space is scanned in the form of vertical lines by the rotating mirror prism 8. The above-described devices are disposed in the upper part 1b of the measurement head. This upper part is set into a motion oscillating about a vertical axis by a motor 18. An angle decoder 19 connected to the motor 18 furnishes the control unit 3 with a feedback signal corresponding to the deflection angle.

Upon one full revolution of the mirror prism 8, the beams scan the object space in the form of three lines. For geometric reasons, in the selected arrangement of 120° available per line, an angle of only 40° can be used for the distance measurement. In the "scanning gaps", as they are known in television technology, the laser beam is deflected by the prism 8 onto a fiber optic waveguide 20. The waveguide, which has a defined length, carries the laser pulse, originating in the emitter diode 9, to the receiver diode 14. At a certain angular position of the prism 8, the laser beam strikes the waveguide 20. The control unit 3 therefore switches the signal processor, at a defined value, over to a calibration mode, in which the value ascertained by the distance sensor unit, is compared with the actual distance defined by the length of the waveguide 20. In the event of deviations, a correction value is calculated, which is taken into account accordingly in calculating the distance from targets in the object space from the propagation time of the laser pulses.

Analogously, in the scanning gap of the prism 8, a reference face 21 is projected onto the diodes 17, 58 and 59. When a defined value is reached, the video channel is switched to a calibration mode, and depending on the embodiment of the reference face 21, a white or black calibration is performed. Naturally, the video channel can also be calibrated to a different gray-scale value.

Figure 6:
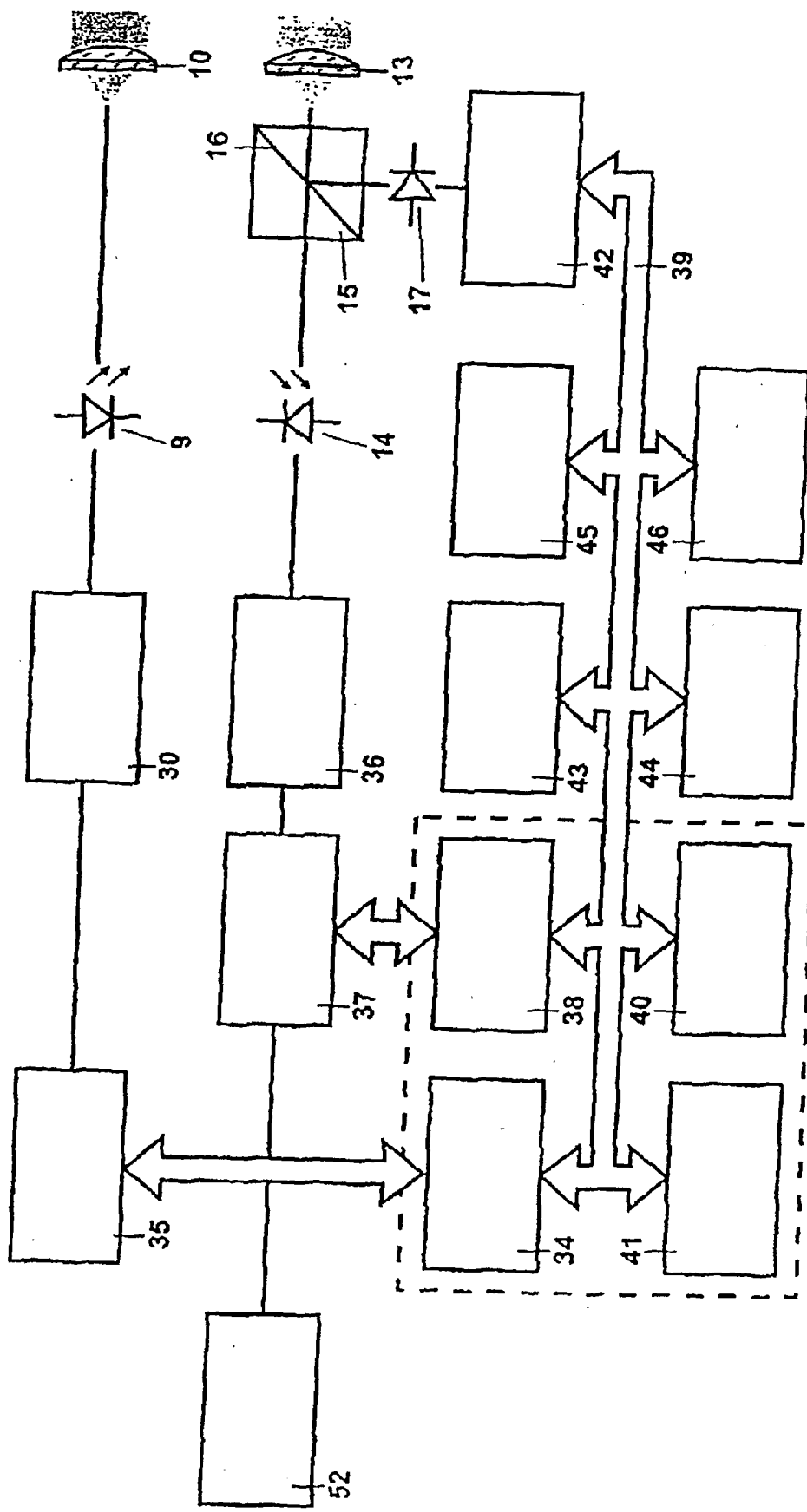
FIG. 6 is a block diagram of the system.

FIG. 6, in the form of a block diagram, schematically shows the layout of the control unit 3 of the laser scanner of the invention; in this diagram, only the systems downstream of the deflection units are shown. Reference numeral 30 indicates a laser transmitter, which triggers the laser diode 9, which precedes the optical element 10 that projects the emitter zone of the laser, preferably into infinity. Along with the transmitter optical element 10, a receiver optical element 13 is provided, whose optical axis is aligned parallel with that of the transmitter optical element 10. A beam splitter prism 15 is provided in the beam path of the receiver optical element 13. The receiver optical element 13 on the one hand focuses the radiation, reflected generally diffusely from a target located in the beam path of the transmitter optical element, to the receiver diode 14. Advantageously, an avalanche diode is used as the receiver diode. Preferably, emitter and receiver diodes are adapted to one another in their spectral characteristics; the receiver diode has its maximum spectral sensitivity in the range in which the emitter diode maximally emits. However, since the receiver diode 14 receives not only the radiation emitted by the emitter diode and reflected from the target but also a great deal of interfering radiation, in the form of daylight or light from the most various artificial light sources, it may be advantageous to place the most narrow-band possible optical filter in front of the receiver diode, the filter having its maximum transmission in the spectral band in which the laser emits.

By means of the beam splitter prism 15, some of the light emitted from the object space is focused onto a receiver diode 17 (and onto the further diodes 58 and 59, not shown in this drawing figure). With such an arrangement, it is therefore possible, parallel to the distance image (active channel), to record a colored or false-color thermal image of the object field via the second, passive channel.

The laser transmitter 30 includes a pulse generator, which triggers the laser diode 9. When the laser transmitter 30 is triggered accordingly by the processor 34, it outputs a train of laser pulses, or so-called bursts. Depending on the command given by the processor, such a burst can include from 1–50 pulses. By means of a delay generator 35 that is controllable by the processor 34, the individual pulses of a burst can be varied in their phase angle, and the phase displacement is effected periodically.

The signals received from the diode 14 are amplified and processed in an amplifier and analog signal processor stage 36. In one possible embodiment, the signals processed in this way are digitized in an analog/digital converter 37 at a sampling frequency, for instance of 60 MHz. These sampled echo signals are stored in a memory 38. Because of the phase displacement of the transmitted pulses of a burst compared to the sampling frequency, the sampled echo signals are stored in different memory cells. If the phase displacement, as indicated above, has a periodicity of 5 pulses, then the sampled pulse is added, after 5 pulses, to the pulses preceding it. If a burst includes 50 pulses, for instance, and if the digitized pulses are "combed" with the period 5, then 10 digital values are added up in one memory cell, and the sampling frequency of 60 MHz appears to be increased by the period number of the combing, in the present example being increased to 300 MHz, so that the scanning theorem can be adhered to with respect to the reconstructed received pulse.

In an alternative embodiment, by means of a time interval digitizer 37, the propagation time between the emitted and received pulse can be digitized, and the results can be stored in a memory 38.

The entire arrangement is clocked by a clock generator 52. The processor 34 and the data store 38 are connected to one another by a data bus, which is shown schematically and identified by reference numeral 39. Also connected to this data bus 39 are a program memory 40 for the processor 34, and a data buffer 41, in which, after a first evaluation by the processor 34, raw data are stored that are read out at the end of the measurement cycle. From these raw data, using algorithms stored in the program memory, a distance value for each individual raster element is ascertained.

The signal furnished by the diode triplet 17, 58 and 59 is amplified and further processed in the video processor stage 42. This video processor is in communication, via the bus 39, with the processor 34 and the other blocks of the system, in particular the digital image memory 43 and the video interface 44. The image coordinates pertaining to the individual raster elements are fed into the system via the data bus 39 from the two deflecting electronic units 45 and 46.

The processor 34, from the received signals, ascertains the amplitude values, signal-to-signal noise ratio, etc., and on the basis of these values defines the number of pulses per burst and triggers the laser transmitter 30 accordingly. Simultaneously, via the data bus 39, a corresponding command is sent to the deflecting electronics 45 and 46. Under unfavorable conditions (low amplitude of the received pulses, low signal-to-signal noise ratio, major variation in measurement value), the number of pulses per burst is increased, and the deflection speed of the scanning device is reduced accordingly. This adaptation can be made individually for each individual raster element, for one line of raster elements, or for the entire scanning cycle.

What is claimed is:

1. A method for the recording of an object space with an opto-electronic distance sensor by a signal propagation time method, comprising:

transmitting optical signals using a transmitter;

receiving optical signals reflected from objects located in the object space using a receiver device;

deflecting optical axes of the transmitter and receiver device using a scanning device;

ascertaining distance values from propagation time or phase angle of the optical signals transmitted using an evaluation device;

splitting off from the beam in a beam path downstream of the scanning device part of the beam and delivering the part of the beam to the receiver device;

ascertaining a pixel from signals of the part of the beam, the pixel being assigned an ascertained distance value and a space, wherein the receiver device includes sensors sensitive to one or more defined spectral ranges;

calculating a temperature value from the signals of the sensors; and generating parallel to a distance image, a coincident thermal image.

2. The method of claim 1, wherein for surveying objects, at least one sensor is for a primary color of visible light.

3. The method of claim 2, wherein at least one sensor for generating a pixel is an infrared sensor sensitized in an infrared spectral range.

4. The method of claim 3, wherein a sensitivity of the receiver device of the distance sensor, in high-temperature applications, is reduced in accordance with background brightness to avoid overdrive from background noise, and wherein for the pixel, one temperature value is ascertained, and from it, an individual correction value for each distance value pertaining to the pixel is calculated, so that measurement error resulting from the reduction in sensitivity can be compensated individually for the pixel.

5. The method of claim 2, wherein the objects have a temperature of approximately 600° C. and higher.

6. The method of claim 2, wherein the sensors are RGB diodes.

7. The method of claim 1, wherein the sensors for generating a pixel are infrared sensors that are sensitized in various IR spectral ranges.

8. The method of claim 7, wherein the infrared sensors are InGaAs or Si diodes.

9. The method of claim 1, wherein a sensitivity of the receiver device of the distance sensor, in high-temperature applications, is reduced in accordance with background brightness to avoid overdrive from background noise, and wherein for the pixel, one temperature value is ascertained, and from it, an individual correction value for each distance value pertaining to the pixel is calculated, so that measurement error resulting from the reduction in sensitivity can be compensated individually for the pixel.

10. The method of claim 1, wherein the transmitter is a laser and the receiver device receives laser radiation.

11. The method of claim 1, wherein the receiver device includes diodes.

12. The method of claim 1, wherein the spectral ranges are infrared.

13. A method for compensating distance measurement error resulting from background noise in high-temperature applications of an opto-electronic distance sensor, said distance sensor scanning an object space to create pixels for a distance and thermal image, the method comprising:

determining, at a scanning position, a distance value from a first portion of an optical signal, wherein said optical signal was transmitted from the distance sensor and reflected from an object in said object space;

receiving, at the scanning position, a second portion of said optical signal by sensors that are sensitive to one or more spectral ranges;

calculating a temperature value from the received second portion of said optical signal;

assigning the distance value and the temperature value to a pixel corresponding to the scanning position;

reducing a sensitivity of the distance sensor in accordance with a measured background brightness; and adjusting the distance value for the pixel in accordance with the assigned temperature value.

* * * * *